United States Patent [19]

Thompson et al.

[11] Patent Number: 4,829,667

[45] Date of Patent: May 16, 1989

[54] METHOD AND APPARATUS FOR MAKING A CABLE TERMINATION ASSEMBLY

[75] Inventors: John M. Thompson, Leroy; Tim K. Hoyt, Mentor, both of Ohio

[73] Assignee: Minnesota Mining and Manufacturing Company, St. Paul, Minn.

[21] Appl. No.: 198,338

[22] Filed: May 25, 1988

Related U.S. Application Data

[62] Division of Ser. No. 948,239, Dec. 31, 1986, Pat. No. 4,762,506.

[51] Int. Cl.[4] ........................ H01R 43/00; B23P 19/00

[52] U.S. Cl. ........................................ 29/858; 29/749; 264/272.11; 264/272.14; 174/117 F; 425/110

[58] Field of Search .................... 179/117 F; 29/33 M, 29/860, 747, 858, 749; 264/272.11, 272.14, 272.15; 425/110, 116

[56] References Cited

U.S. PATENT DOCUMENTS 4,252,397 2/1981 Eigenbrode et al. ............. 29/860 X
4,379,361 4/1983 Webster et al. ............. 174/117 F X
4,528,749 7/1985 Heft .................................. 29/858 X
4,725,243 2/1988 Pretchel et al. .................. 29/860 X
4,767,891 8/1988 Biegon et al. ............... 174/117 F X

FOREIGN PATENT DOCUMENTS

83/01213 4/1983 PCT Int'l Appl. ................ 29/33 M
84/01860 5/1984 PCT Int'l Appl. ................... 29/747

*Primary Examiner*—Carl J. Arbes
*Attorney, Agent, or Firm*—Renner, Otto, Boisselle & Sklar

[57] ABSTRACT

A cable termination assembly for in line emulation function includes plural pairs of electrical IDC (insulation displacement connection) contacts that face opposite directions on opposite sides of a multiconductor cable and a strain relief for holding together the cable and the contacts for use such that electrical connection is provided among each pair of contacts and a respective conductor of the cable. Desirably the IDC connections of contacts to the cable conductors are made simultaneously by contacts on both sides of the cable. A method and a machine for making the assembly provide for such simultaneous IDC connections and subsequent direct molding of the strain relief.

10 Claims, 4 Drawing Sheets

METHOD AND APPARATUS FOR MAKING A CABLE TERMINATION ASSEMBLY

This is a divisional of co-pending application Ser. No. 948,239 filed on Dec. 31, 1986, now U.S. Pat. No. 4,762,506 issued Aug. 9, 1988.

TECHNICAL FIELD

This invention relates generally, as indicated, to electrical connection products, more particularly to cable termination assemblies, and even more particularly to an in line emulator, e.g. to interface between an integrated circuit DIP device or the like and a socket or the like to which such device is intended to be connected while also providing external connections for both such device and/or that to which it is intended to be and in fact is connected. This invention also relates to methods for making such a cable termination assembly and the like.

BACKGROUND

In the field of electronics integrated circuits are provided in various packages. One such package is known as a DIP (dual-in-line) package in which the actual integrated circuit chip is within the package housing and electrical leads or contacts, e.g. pin contacts, extend to the outside of the package in a pair of rows, say of eight or more contacts each, to connect the integrated circuit with the outside world. Other types of patterns or arrangements of the integrated circuit package or the like also are used, such as a rectangular pattern of a leaded chip carrier. Regardless of the pattern of the integrated circuit package leads, such leads typically are connected mechanically and electrically to other circuits, e.g. by connection through plated through holes in a printed circuit board, by surface mount techniques to terminal pads on a printed circuit board, by connections in an appropriate socket device, and so on.

For facility and in the interest of brevity, the present invention will be described in detail below with respect to a DIP package device (hereinafter sometimes simply referred to as "DIP") with an integrated circuit or other device or system therein or associated therewith. However, it will be appreciated that the principles of the invention may be employed with integrated circuit packages and the like of other patterns of contacts.

For various reasons sometimes it is desirable to connect further circuitry to an integrated circuit package while allowing the integrated circuit package still to function in usual manner. Thus, for example, for a sixteen pin DIP that ordinarily is plugged into a DIP socket, it may be desirable to connect the respective leads of a multiconductor flat ribbon cable to respective contacts of the DIP while the contacts of the DIP remain electrically connected with the contacts within the socket and, thus, with further circuitry to which those socket contacts are in turn connected.

In the past the foregoing was accomplished by attaching two cable terminations to an end of a multiconductor flat ribbon cable—one cable termination (a DIP connector) had pin contacts and the other cable termination had female, say fork, contacts. The mentioned pin contacts of the DIP connector were analagous to the pin contacts or leads of the DIP package to connect with the plated through holes of a printed circuit board, to an integrated circuit socket, etc. The mentioned fork contacts served in a sense as a DIP socket type device to receive the leads of the integrated circuit DIP package. The two cable terminations were coupled to the cable at axially spaced apart locations along the length of the cable; and the cable was folded over a bend of about 180 degrees to place the socket device above and essentially in line with the DIP connector device. In this way pin contact one of the integrated circuit package would be connected via pin one of the socket type cable termination to conductor one of the cable; and such conductor one would in turn be connected to pin one of the DIP connector and also would provide an electrical connection to a further device. Such electrical connection to a further device may be used for various purposes, e.g. to extend memory, to add capacity or functions, to provide signal monitoring and/or signal injection, and so on.

There have been a number of disadvantages to the prior techniques and devices just described for providing in line emulation functions. For one, two different cable terminations must be coupled to the cable in one way or another requiring a fair amount of labor, machine time and materials and increasing the possibility of a fault. Second, the resulting product requires a relatively large space for the over-placed cable terminations have a relatively high profile. Third, a means is needed to hold together the several cable terminations relative to each other, and the stronger the connection of such parts the larger they will be and correspondingly the more space will be required therefor. It is, of course, desired to minimize space requirements for at least most parts used in electronics thereby to increase parts density and functionality of a device.

Reference is made to U.S. Pat. No. 4,030,799 for Jumper Connector. The entire disclosure of such patent hereby is incorporated by reference. In such patent is disclosed a cable termination assembly including a multiconductor flat ribbon cable and a cable termination formed of plural insulation displacement connection (hereinafter referred to as IDC) contacts and a strain relief body that is molded directly to at least part of the cable and contacts to form an integral structure therewith. The IDC contacts have sharp points at the end of a pair of legs that define a slot therebetween; the points may be used to pierce through the cable insulation so that a respective cable conductor enters the slot and makes electrical connection with the contact. The mentioned legs are at one side of a base of the contact, and a pair of tines extend from the opposite side of the base to form a fork contact.

To manufacture such a cable termination assembly, the fork contacts may be placed in a mold such that the fork tines enter a retention cavity in the mold. The IDC legs of the contacts are positioned to face out from the mold being exposed to perform the desired IDC connection function with respect to a cable placed with respect to the same. Such a cable is placed over the IDC legs, and then the mold may be closed. Upon such closure, the mold itself, or more specifically core bars therein, presses the cable against the IDC legs causing the latter to pierce through the cable insulation to make the desired IDC connection with a respective cable conductor. With the mold closed and likely at least partly shutting off against part of the cable, a mold cavity is defined, and plastic or other electrically nonconductive material may be injected into the cavity to form the strain relief as an integral structure with the cable and contacts. Afterwards, the mold may be opened to remove the part and, if desired, a cap or cover may be placed over the exposed fork tines to protect them and to facilitate guiding pin contacts or the like into engagement therewith.

The contacts are arranged in a pair of parallel rows as a DIP configuration. The base of each contact includes or provides an offset so that the IDC legs and the fork tines are somewhat offset from each other so that the contacts in one of the parallel rows thereof align with and connect respectively with every other cable conductor, while the contacts in the other row align with and connect respectively with the other cable conductors. Using such offset arrangement, tee fork contacts in the pair of rows thereof are in fact arranged in an aligned parallel relation or DIP pattern, as is known. As is disclosed in such '799 patent, the contacts may be of a type other than fork contacts. One such contact is that referred to herein as a DIP contact, which is similar to the IDC contact just described but has a single pin contact or lead extending from the base in place of the pair of fork tines mentioned earlier.

BRIEF SUMMARY OF THE INVENTION

According to the present invention, the fundamental features are directed to a cable termination assembly for in line emulation function provided by plural pairs of electrical IDC contacts that face opposite directions on opposite sides of a multiconductor cable and a strain relief for holding together the cable and the contacts for use such that electrical connection is provided among each pair of contacts and a respective conductor of the cable. Desirably the IDC connections of contacts to the cable conductors are made simultaneously by contacts on both sides of the cable.

According to another aspect of the invention, a cable termination assembly for in line emulation function includes a multiconductor electrical cable, plural pairs of electrical IDC contacts positioned with respect to such cable to face in opposite directions on opposite sides of the cable, each of the contacts of respective pairs thereof effecting IDC connection with a respective cable conductor, and a strain relief for holding together the cable and the contacts for use such that electrical connection is provided among each pair of contacts and a respective conductor of the cable, the assembly being made by the process of effecting IDC connections between respective pairs of contacts and respective cable conductors an molding said strain relief directly to at least part of the contacts and cable to form an integral structure therewith.

According to a further aspect of the invention, a method of making a cable termination assembly includes placing a first plurality of IDC electrical contacts in a first mold part, placing a second plurality of IDC electrical contacts in a second mold part, placing an electrical cable between the first and second mold parts with the cable conductors aligned with relative to respective pairs of first and second contacts, and closing such mold parts relative to each other to form a mold cavity while effecting IDC connection of contacts and cable conductors simultaneously from opposite sides of the cable. Furthermore, preferably a strain relief body is molded in the mold cavity to hold such contacts and cable as an integral structure.

A number of advantages inure to the cable termination assembly of the present invention. Examples include the formation of a secure device with precise contact alignment in an in line emulator and the reducing of the height and general space requirements for an in line emulator type of device. Another example is the facility with which the cable termination assembly of the invention can be made using the simultaneous IDC connection process being effected from both sides of a cable.

These and other objects, aspects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTIONS OF THE DRAWINGS

DESCRIPTION OF THE PREFERRED EMBODIMENT

Figure 1:
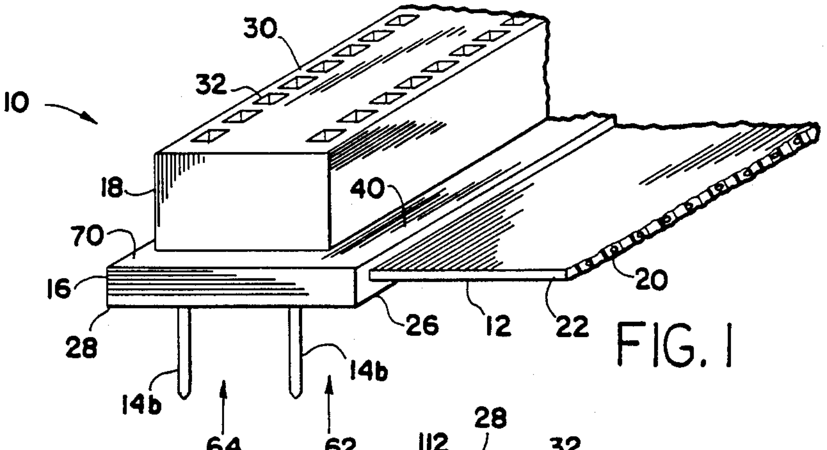
FIG. 1 is a fragmentary isometric view of a cable termination assembly according to a preferred embodiment of the invention.
Figure 2:
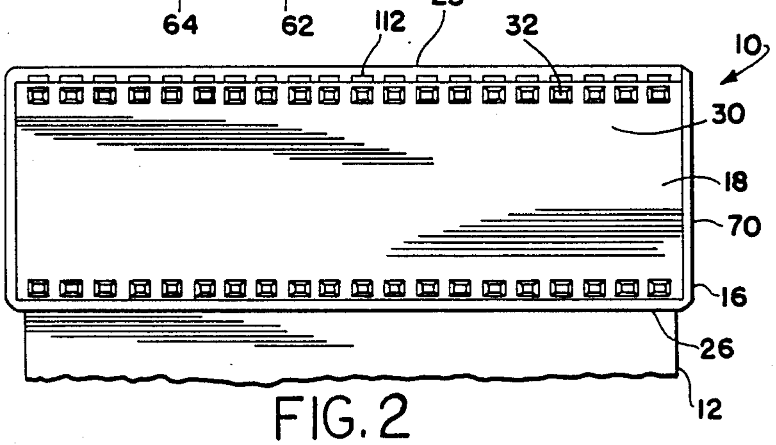
FIG. 2 is a top plan view of the assembly of FIG. 1.

Referring, now, in detail to the drawings, wherein like reference numerals designate like parts in the several figures, and initially to FIGS. 1-7, a cable termination assembly according to the invention for use, for example, as an in line emulator, is generally designated 10. The assembly 10 includes a multiconductor cable 12, a plurality of pairs 14 of electrical contacts *14a* that generally extend on one side of the cable and electrical contacts *14b* that generally extend on the other side of the cable, and a strain relief 16 for securely holding together the cable and contacts. Moreover, if desired, a cap 18 may be used to guide external contacts into engagement with respective contacts *14a*.

Exemplary use of the assembly 10 as an in line emulator would be, as follows. An integrated circuit DIP device (not shown) may be removed from a DIP socket; and the contacts *14b* of the assembly then may be plugged into the DIP socket to connect with the respective contacts in the latter. The integrated circuit DIP device then may be plugged into the assembly 10 to make connections with the respective contacts 14*a* thereof. As will be evident from the drawings and the following description, each pair of contacts 14*a*, 14*b* and a respective conductor 20 of the cable 12 are electrically connected together. Therefore, each contact of the integrated circuit DIP device will be electrically connected both to the same circuit or contact in the DIP socket to which it previously had been connected and will also be electrically connected to a particular cable conductor 2 that may be carried to another device, system, circuit, etc. (not shown) for signal monitoring, signal injecting, and other purposes.

The cable 12 preferably is a multiconductor flat ribbon cable having plural conductors 20 within the insulation 22 thereof. However, it will be appreciated that the cable may be formed of discrete insulated wires or may be of another type other than either flat ribbon or discrete insulated wire type.

The strain relief 16 preferably is molded directly to at least part of the contacts 14*a*, 14*b* and to at least part of the cable to form an integral structure therewith. The material of which the strain relief is molded may be thermoplastic material capable of being molded using plastic injection molding techniques. In one embodiment the material of which the strain relief is molded may be compatible with the cable insulation 22 so as to bond to the latter further increasing the integrity of the integral structure of the assembly 10. Moreover, in one embodiment the strain relief may fully or at least substantially fully encapsulate the junctions 24 between respective contacts 14*a*, 14*b* and a respective cable conductors 20.

The cable 12 exits the strain relief 16 at a side 26 thereof. In the illustrated embodiment the cable only exits the side 26 of the strain relief. However, in an alternate embodiment not illustrated the cable 12 may exit from both sides 26, 28, whereby the cable termination effectively is located between the ends of the cable 12 instead specifically at one end.

Figure 3:
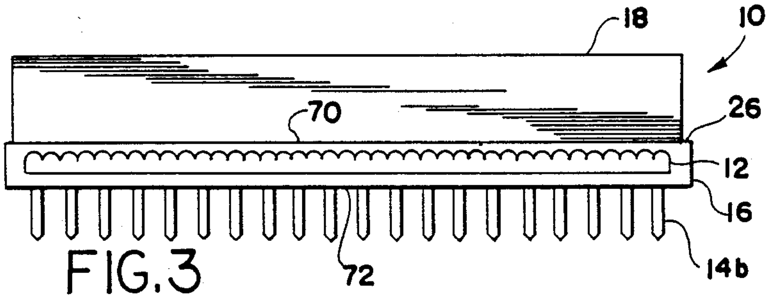
FIG. 3 is a side elevation view of the assembly of FIG. 1 looking toward the side of the assembly from which the cable exits the strain relief.
Figure 4:
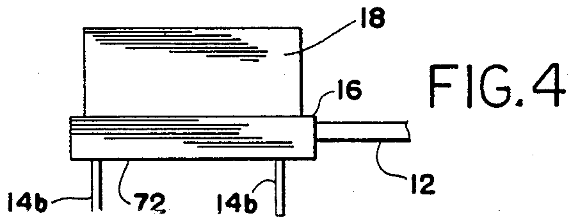
FIG. 4 is an end elevation view of the assembly.

As is seen in FIGS. 1 and 3, for example, in the top 30 of the cap 18 are a plurality of openings 32 providing entrance ways into the chambers or cells 34 (FIG. 11) within the cap. Each chamber 34 provides an isolating for the contacting portion of the contacts 14*a*, each from the others, and also provides a guide way for guiding pin contacts of an integrated circuit DIP device into aligned electrical connecting engagement with the respective contacts 14*a*. Preferably the cap 18 is attached to the strain relief 16; for example, such attachment may be by ultrasonic welding or by other means. There may be provided a welding pillar 36 (or welding pillars) on the strain relief 16 that fits into an opening 38 (respective openings) in part of the cap 18, and the ultrasonic welding attachment may be carried out to effect welding of the pillar(s) 36 at such opening(s) 38. Preferably, too, the height of the cap 18 above the top surface 40 of the strain relief 16 is adequate to provide the contact guidance and protection functions mentioned above; however, minimal height is desirable to minimize the overall height profile of the assembly 10.

Figure 11:
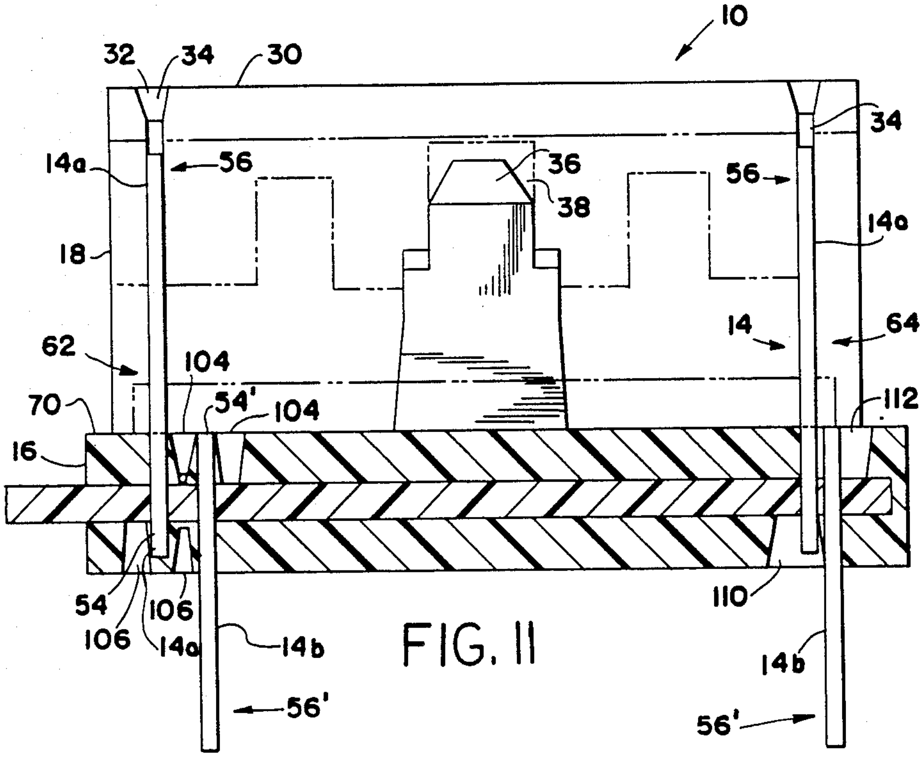
FIG. 11 is an end view partly in section of the cable termination assembly of the invention with the cap in place on the strain relief.

As is seen in FIG. 11, various cored out spaces may molded in the cap 18, most of which minimize material required to make the cap. The cap may be formed by plastic injection molding techniques.

Referring in particular to FIGS. 5–11, details of the contacts 14*a*, 14*b* and of the strain relief 16 are shown. The contact 14*a* is a fork contact having a pair of elongate fork tines 50, a base 52, and of IDC legs 54. The elongate tines extend generally in parallel from one side of the base 52 on opposite sides of a center-line that extends between the tines. The contacting portion 56 of the tines 50 is near the end thereof remote from the base 52. The IDC legs 54 extend generally in parallel from the opposite side of the base 52 relative to the fork tines; and such legs 54 define a slot 58 therebetween to receive therein a cable conductor 20 to connect electrically therewith. The legs 54 are pointed at the ends 60 thereof to facilitate piercing through the cable insulation 22.

Preferably the center-line of the slot 58 is parallel to but offset from the center-line of the fork tines due to the offset relation provided by the base 52. Moreover, the offset direction in one of the rows 62 of pairs 14 of contacts is in one direction and the offset direction in the other of the rows 64 is in the opposite direction to facilitate connecting with all the cable conductors in a relatively close packed relation while providing a DIP pattern for the contacts 14. Thus, for example, a pair of contacts 14 in the row 62 may be connected to one cable conductor, and the cable conductor(s) on opposite sides of such one cable conductor would be connected to respective pairs of contacts in the other row 64, e.g. as is described in the above-mentioned '799 patent.

With the cap 18 positioned on the strain relief 16, the fork tines 50 fit into respective chambers 34 placing the contacting portions 56 of the contacts into position to engage a pin contact or the like inserted into the chamber from the top of the cap.

As is seen in the drawings, the contacts 14*b* are DIP contacts, meaning that the contacting portions 56' thereof are like the pin contacts or leads of a DIP device. Such configuration of the contacts 14*b* is exemplary, and it will be appreciated that such contacts 14*b* as well as the contacts 14*a* may be of types other than those shown and described in detail herein.

The contact 14*b* includes an elongate pin-like member 50' that forms the contacting portion 56', a base 52', and a pair of IDC legs 54'. The pin-like member extends generally in parallel from one side of the base 52' in the opposite direction from the IDC legs. The contacting portion 56' being a pin-like member it may be inserted into a DIP socket, soldered to a plated through hole of a printed circuit board, etc. for further electrical connection thereof. The IDC portion of the contact 14*b* is similar to that of the contact 14*a*, and operation, e.g. to effect IDC connection with a cable conductor 20, also is similar.

Preferably the center-line or axis of the slot 58' is parallel to but offset from the center-line of the pin-like member 50' due to the offset relation provided by the base 52' for the above described purposes vis-a-vis the connecting of the respective pairs 14 of contacts in a given row 62, 64 to alternate conductors 20.

The contacting portion 56 of the contacts 14*a* extend up out of the top 70 of the strain relief 16. The contacting portion 56' of the contacts 14*b* extend down out of the bottom 72 of the strain relief 16. (Such directions are relative to FIG. 1, for example, and are not intended to be limiting.) The contacts 14*a*, 14*b* of each respective pair 14 thereof are electrically connected together via the respective cable conductor 20 to which they both are electrically connected by respective IDC portions thereof.

Figure 7:
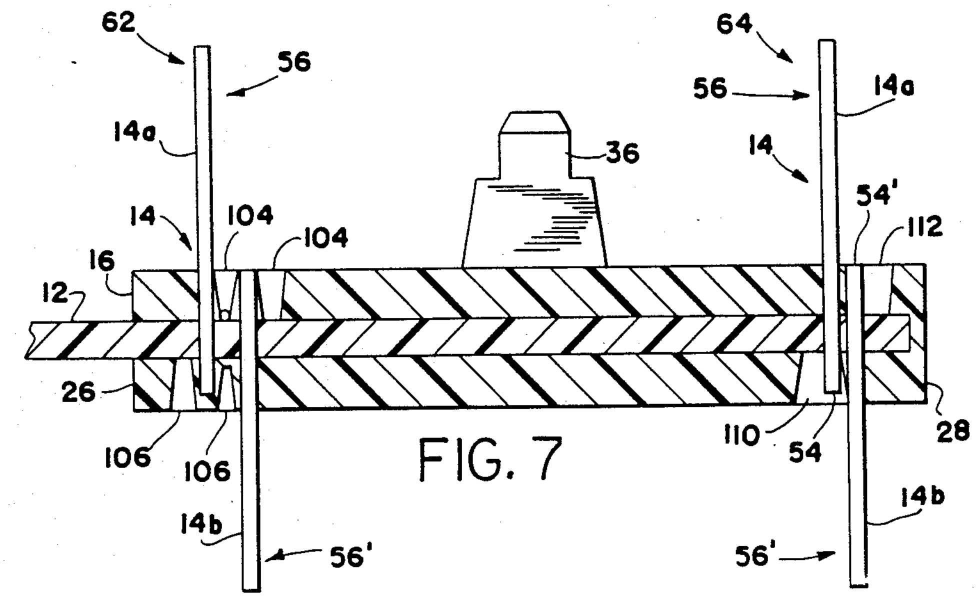
FIG. 7 is an end view, partly in section, of the assembly.
Figure 8:
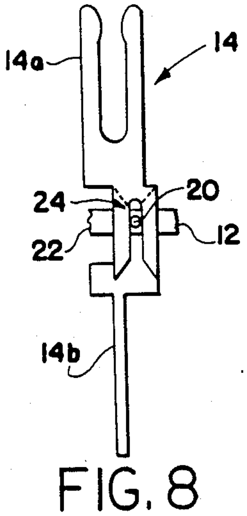
FIG. 8 is a fragmentary view of the overlapped IDC connection and positioning of a pair of contacts on opposite sides of the cable of the assembly prior to the molding of the strain relief.

As is seen in FIG. 8, for example, both of the contacts 14*a*, 14*b* of a given pair 14 effect IDC Connection with a particular cable conductor 20. Due to the offset relations provided by the respective bases 52, 52' of the contacts 14a, 14b and the locations of the contacting portions 56, 56' thereof, the approximate center-line between the fork tines 50 of the contact 14a and the axial extent of the pin-like member 50' of the contact 14b are substantially parallel and nearly coaxial. Such center-line and axial extent are slightly displaced relative to each other along the conductor 20 in the row 64 and are further displaced relative to each other in the row 62, as is illustrated in FIGS. 7 and 11, for example. Such displacement in the row 64 accomodates the thickness of the respective contacts 14a, 14b and such wider displacement in the row 62 permits the spacing of the rows 62, 64 of contacts 14a to be different from the spacing of the rows 62, 64 of contacts 14b, as is illustrated, e.g. to accomodate connections to different size sockets, integrated circuit DIP devices, etc.

Figure 9:
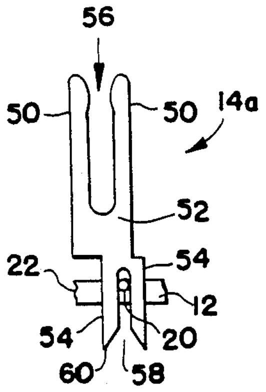
FIGS. 9 and 10 are, respectively, fragmentary views similar to FIG. 8 of the fork contact and of the DIP contact of one pair of contacts depicting the IDC connection thereof to a cable conductor without showing the other respective contact of the particular pair.
Figure 10:
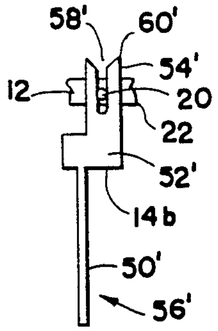

To simplify the depiction of the IDC relation o a contact 14a with respect to a cable 12, FIG. 9 illustrates the same without the related contact 14b of a pair 14 of contacts of FIG. 8, for example. Similarly, in FIG. 10, the IDC relation of a DIP contact 14b to the cable 12 is shown without the contact 14a of the pair 14 of FIG. 8. However, it will be appreciated that the contacts 14a, 14b of each pair 14 thereof in both of the rows 62, 64 simultaneously will be moved relative to each other and relative to the cable 12 to effect simultaneous IDC connections with respective conductors in the manner depicted in FIG. 8, for example. The aforementioned simultaneous IDC function preferably is carried out in a mold, as is described further below.

Figure 12:
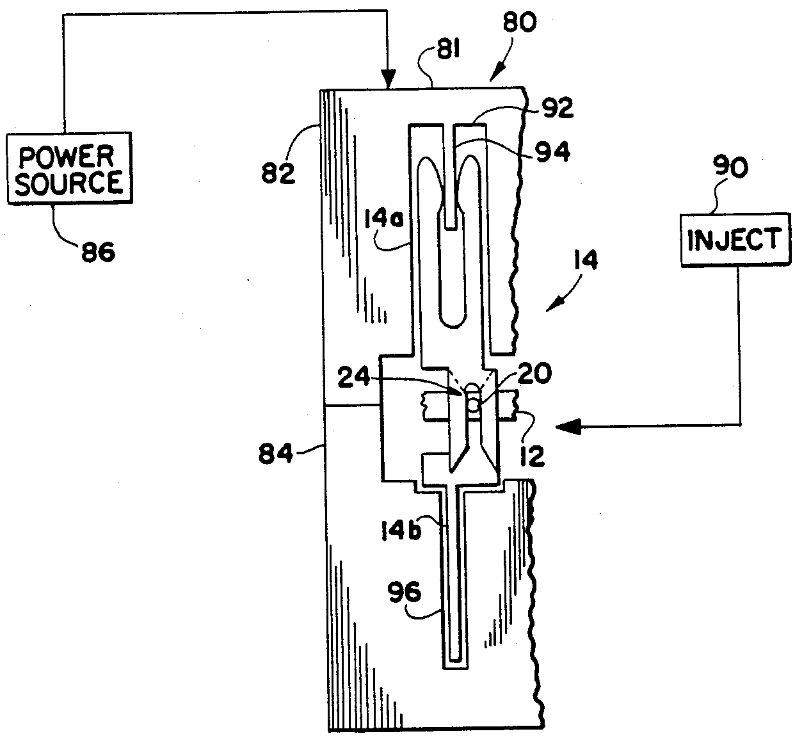
FIG. 12 is a schematic side elevation view of a molding machine for making the cable termination assembly of the invention.

Briefly referring to FIG. 12, a molding machine 80 for making the cable termination assembly 10 is shown schematically. The machine 80 includes a mold 81 with two mold halves 82 (the A half) and 84 (the B half), means 86 for moving the A half 82 toward the B half to close the mold to form a mold cavity 88 and to open the cavity 88. An inject mechanism 90 also is provided to inject molding material into the mold cavity 88 when it is desired to mold the strain relief 16. To use the molding machine 80, the mold is opened by withdrawing the A half relatively far from the B half. A plurality of fork contacts 14a are inserted into respective cavities 92 in the A half 82 and are retained therein by resilient engagement with ribs 94. The contacts 14a may be positioned on a break away strip to form a comb of contacts; and after they are positioned in the manner illustrated in FIG. 12, the break away strip may be broken away and removed. A plurality of DIP contacts 14b also similarly may be positioned in the B half 84 with the pin-like members 50, extending into cavities or openings 96 in the B half to secure the DIP contacts in position for the IDC function.

With the full complement of contacts 14a, 14b to form the respective rows 62, 64 in the mold 81, the cable 12 is placed in position with respect to the mold halves and the IDC portions of the contacts. Thereafter, the mold 81 is closed as the power source 86 moves the A half 82 toward the B half 84.

Within the mold halves 82, 84 are cores that provide functions of holding the cable in place during molding of the strain relief 16 and of applying pressure against the cable to urge the same into IDC connection relation with respective contacts. Although such cores and core bars are not specifically shown in FIG. 12 or in the other figures, the open areas formed in the strain relief 16 as a result of such cores and core bars are shown and will provide one skilled in the art with information adequate to know where and how to place the cores and core bars. Thus, for example, there are two relatively long slots 100 shown in the top and bottom views of the strain relief 16; and there are two shorter inline slots 102 parallel with the slots 100 but separated from each other by the pillar 36. (If two pillars are employed in line with the slots 102, for example, three in-line slots 102 may be provided each relatively adjacent pair thereof separated by a respective pillar.) Such slots 100, 102 are formed by core bars included in the mold 81, for example, to hold the cable in relatively fixed position during molding of the strain relief 16.

Referring to the row 62 of contacts 14a, 14b, a pair of cores are -provided on both sides of each pair of IDC legs 54, 54' to form, respectively, the cored areas 104, 106. Such cores (not shown) press against the cable 12 to urge the same into IDC relation with the IDC legs of the respective contacts 14a, 14b during closing of the mold 81. Since the contacts 14a, 14b in the row 62 thereof are displaced along the respective cable conductors 20 relatively far apart, especially compared to the juxtaposed relation of the contacts 14a, 14b in the row 64, two cores are used at each surface of the cable, respectively to form the cored areas 104 on the top surface 70 of the strain relief 16 and the cored areas 106 on the bottom surface 72 in the manner depicted most clearly in FIGS. 5–7 and 11.

Figure 5:
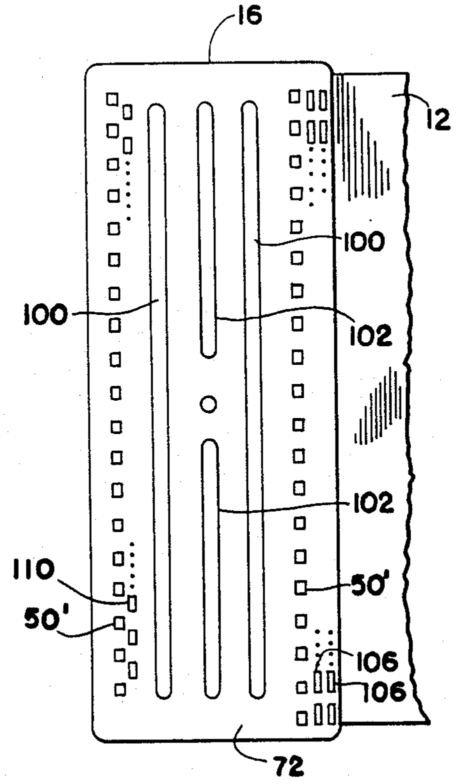
FIG. 5 is a bottom plan view of the assembly.
Figure 6:
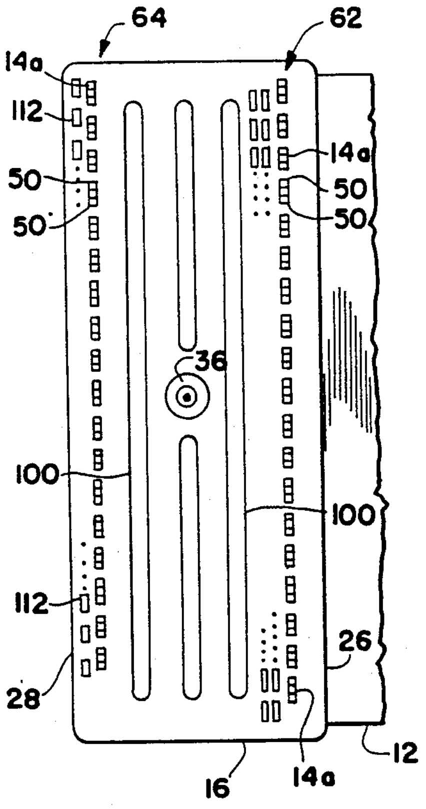
FIG. 6 is a top plan view of the assembly with the cap removed.

In row 64 of contacts 14a, 14b though, the contacts are in close juxtaposition along the length of the respective cable conductors 20. Therefore, for the contact 14a, the IDC portion of the contact 14b provides a tendency to force the cable 12 against the IDC portion of the contact 14a on one side of the contact 14a and a single core (not shown) located primarily on the other side of the contact 14a also provides the desired pressure or force against the cable 12 to assure that the IDC portion of the contact 14a effects IDC connection with the respective cable conductor. The cored opening 110 created by such core is seen in FIGS. 5, 7 and 11. Moreover, the IDC portion of the contact 14a provides a similar force against the cable 12 to urge the cable into the IDC portion of the contact 14b together with a further core (not shown) that produces the cored out areas 112, which are seen most clearly in FIGS. 6, 7 and 11.

From the foregoing it will be appreciated that the contacts 14a, 14b may be used to effect simultaneous IDC connections with respective conductors 20 of the cable 12, e.g. upon closing of the mold 81, and that the strain relief 16 can be molded directly to the contacts and cable to form an integral structure. After such molding has been completed, the mold 81 can be opened and the cable termination assembly 10 removed therefrom. The cap 18, if used, may be attached, then, to complete the assembly 10.

Of course the mold halves 82, 84 have provision for exiting the cable 12 from the mold cavity 88 and for sealing around the cable to prevent or minimize molding material from flowing out of the mold cavity along the cable. The portions of the mold parts which close around the cable exiting the cavity also serve to hold the cable in place during molding of the strain relief. As above indicated the cable may exit from both sides of the strain relief 16 and to this end during molding the cable would exit from both sides of the mold cavity. Even if the termination is to be located at one end of the cable as in the illustrated embodiment, preferably the cable extends from and is held at both sides of the mold cavity, and then after molding of the strain relief and removal thereof from the mold, the unneeded cable portion extending from one side 28 of the strain relief may be trimmed off for example flush with such one side as seen in FIGS. 7 and 11.

We claim:

1. A method of making a cable termination assembly, comprising placing a first plurality of IDC electrical contacts in a first mold part, placing a second plurality of IDC electrical contacts in a second mold part, placing an electrical cable between said first and second mold parts with the cable conductors aligned with relative to respective pairs of first and second contacts, closing such mold parts relative to each other to form a mold cavity while effecting IDC connection of contacts and cable conductors simultaneously from opposite sides of the cable.

2. The method of claim 1, further comprising molding a strain relief body in the mold cavity to hold such contacts and cable as an integral structure.

3. The method of claim 2, further comprising using core means to apply pressure to the cable to effect IDC connection of the cable conductors and respective contacts.

4. The method of claim 1, further comprising using the IDC portion of one contact on one side of the cable to apply pressure to the cable to effect IDC connection of the cable conductors by a contact on the opposite side of the cable.

5. The method of claim 4, wherein such contacts are arranged in aligned pairs, one contact of each pair being on one side of the cable and a second contact of each pair being on the other side of the cable, and wherein said contacts of each pair cooperate with each other and with the cable to effect simultaneously IDC connection of both contacts of the pair with a respective cable conductor.

6. The method of claim 5, further comprising using core means on one side of each contact of each pair opposite the side of such contact proximate the other contact of such pair additionally to apply pressure to the cable to effect IDC connection of the cable conductors and respective contacts.

7. The method of claim 1, further comprising arranging the contacts on one side of the cable in a first pair of rows and the contacts on the other side of the cable in a second pair of rows, and wherein the spacing between the second pair of rows is different from the spacing between the first pair of rows.

8. The method of claim 1, wherein the first plurality of contacts are fork contacts and the second plurality of contacts are DIP contacts, and wherein the axis of the pin contact portion of each DIP contact is coaxially aligned with the center-line axis between the tines of a respective fork contact.

9. A molding machine for making a cable termination assembly, comprising first mold half means for retaining therein plural fork contacts, said first mold half means including rib means for providing a surface against which such fork contacts may resiliently grasp, second mold half means for receiving and holding therein the contacting portion of a second plurality of contacts, such contacts being positioned in the said mold halves to expose the IDC portions of respective pairs of contacts in generally confronting relation, a space in the machine for receiving therein at least part of a cable, and means for permitting relative movement of said mold halves toward each other to cause the IDC portions of respective contacts to effect IDC connection with conductors of such cable.

10. The machine of claim 9, further comprising means for injecting molding material into such cavity to form a strain relief for the contacts and cable.

* * * * *

UNITED STATES PATENT AND TRADEMARK OFFICE
CERTIFICATE OF CORRECTION

PATENT NO. : 4,829,667

DATED : May 16, 1989

INVENTOR(S) : Thompson et al.

It is certified that error appears in the above-identified patent and that said Letters Patent is hereby corrected as shown below:

Column 9, line 13, delete "rela-".

Column 9, line 14, delete "tive to".

Column 9, line 15, before "closing" insert --and--.

Column 9, line 29, replace "the", first occurrence, with --a--; and replace "conductors by" with --conductor with--.

Column 10, line 37, replace "such" with --a--.

Signed and Sealed this

Twenty-sixth Day of February, 1991

*Attest:*

HARRY F. MANBECK, JR.

*Attesting Officer* *Commissioner of Patents and Trademarks*